(12) United States Patent
Pauritsch

(10) Patent No.: US 7,768,216 B2
(45) Date of Patent: Aug. 3, 2010

(54) CONTROL CIRCUIT AND METHOD FOR CONTROLLING LIGHT EMITTING DIODES

(75) Inventor: Manfred Pauritsch, Graz (AT)

(73) Assignee: Austriamicrosystems AG, Unterpremstaetten (AT)

( * ) Notice: Subject to any disclaimer, the term of this patent is extended or adjusted under 35 U.S.C. 154(b) by 983 days.

(21) Appl. No.: 11/477,146

(22) Filed: Jun. 28, 2006

(65) Prior Publication Data

US 2008/0007497 A1    Jan. 10, 2008

(51) Int. Cl.
*H05B 37/02* (2006.01)

(52) U.S. Cl. .................. 315/360; 315/307; 315/169.1; 315/312; 345/46; 345/77; 345/102; 345/691

(58) Field of Classification Search ............. 315/169.1, 315/169.3, 291, 307, 224, 360, 362, 312; 345/46, 61, 63, 76, 77, 82, 83, 102, 690, 345/691

See application file for complete search history.

(56) References Cited

U.S. PATENT DOCUMENTS

| | | | |
|---|---|---|---|
| 5,479,159 A | 12/1995 | Kelly et al. | |
| 5,959,291 A | 9/1999 | Jensen | |
| 6,127,783 A | 10/2000 | Pashley et al. | |
| 6,498,440 B2 | 12/2002 | Stam et al. | |
| 6,803,891 B2 * | 10/2004 | Okuda | 345/82 |
| 6,850,044 B2 | 2/2005 | Hansen et al. | |
| 6,894,442 B1 | 5/2005 | Lim et al. | |
| 7,176,948 B2 * | 2/2007 | Lewis | 345/691 |
| 2001/0010509 A1 | 8/2001 | Okuda | |
| 2002/0060653 A1 | 5/2002 | Okuda | |
| 2002/0118304 A1 | 8/2002 | Mandl | |
| 2002/0130893 A1 | 9/2002 | Okuda | |
| 2003/0043027 A1 | 3/2003 | Carson et al. | |
| 2004/0000462 A1 | 1/2004 | Sheng-Hsing | |
| 2004/0004462 A1 | 1/2004 | Bean et al. | |
| 2005/0116662 A1 | 6/2005 | Sanchez | |
| 2006/0049332 A1 | 3/2006 | Vornsand et al. | |
| 2006/0062108 A1 | 3/2006 | Muthu | |
| 2009/0167260 A1 | 7/2009 | Pauritsch | |
| 2009/0243510 A1 | 10/2009 | Pauritsch | |
| 2009/0302769 A1 | 12/2009 | Trattler | |

FOREIGN PATENT DOCUMENTS

| | | |
|---|---|---|
| AT | 387 479 | 1/1989 |
| DE | 33 203 97 | 12/1984 |
| DE | 34 257 82 | 2/1985 |

(Continued)

OTHER PUBLICATIONS

Int'l Preliminary Report on Patentability in Application No. PCT/EP2006/005972, dated Jan. 16, 2008.

(Continued)

*Primary Examiner*—Haissa Philogene
(74) *Attorney, Agent, or Firm*—Fish & Richardson P.C.

(57) ABSTRACT

A control circuit for controlling light emitting diodes comprises a switch for turning on or off a string of light emitting diodes. A combiner generates a control signal from a data signal and a noise signal. A sigma delta modulator receives the control signal and a clock signal with a clock period and generates a switching signal for controlling the switch.

18 Claims, 5 Drawing Sheets

FOREIGN PATENT DOCUMENTS

| | | |
|---|---|---|
| DE | 42 326 18 | 3/1994 |
| DE | 29701571 | 5/1997 |
| DE | 196 37 151 | 10/1998 |
| DE | 199 21 146 | 10/2000 |
| DE | 103 21 930 | 12/2003 |
| DE | 10357776 | 7/2005 |
| DE | 10 2004 030883 | 1/2006 |
| DE | 10 2004 047 669 | 4/2006 |
| EP | 0 798 840 | 10/1997 |
| EP | 1 555 859 | 7/2005 |
| EP | 1 589 519 | 10/2005 |
| WO | WO02/071815 | 9/2002 |
| WO | WO03/037042 | 5/2003 |
| WO | WO03/056684 | 7/2003 |
| WO | WO2004/082098 | 9/2004 |
| WO | WO2006/081613 | 8/2006 |
| WO | WO2007/000272 | 1/2007 |
| WO | WO2007/082692 | 7/2007 |
| WO | WO2007/128528 | 11/2007 |
| WO | WO2008/000465 | 1/2008 |

OTHER PUBLICATIONS

Int'l Search Report & Written Opinion in Application No. PCT/EP2006/005972, dated Jul. 23, 2007.
Int'l Search Report in Application No. PCT/EP2007/000261, dated Dec. 10, 2007.
Int'l Preliminary Report on Patentability in Application No. PCT/EP2007/000261, dated Sep. 2, 2008.
Int'l Preliminary Report on Patentability in Application No. PCT/EP2007/003969, dated Dec. 10, 2008.
Int'l Search Report in Application No. PCT/EP2007/003969, dated Oct. 26, 2007.
Int'l Preliminary Report on Patentability in Application No. PCT/EP2007/005694, dated Oct. 7, 2008.
Anonymous, "Charge-pump and Step-up DC-DC Converter Solutions for Powering White LEDs in Series of Parallel Connections", [online] [Apr. 23, 2002], XP002440940, retrieved from the Internet<URL:http://www.maxim-ic.com/appnotes.cfm/appnote_number/1037/CMP/WP-33>, Retrieved on Jul. 4, 2007.
Data Sheet MAX1402: "+5V, 18-Bit, Low-Power, Multichannel, Oversampling (Sigma Delta) ADC", Jul. 2002, Maxim Integrated Products, Sunnyvale, CA, USA, 38 pages.
Ushaw et al., "An analysis of sigma-delta modulators as continuous systems", IEE, 1993, pp. 3/1-3/5, London, United Kingdom.
International Search Report from corresponding PCT Application No. PCT/EP2007/005694, mailed Oct. 23, 2007, 5 pages.
Written Opinion of the International Searching Authority from corresponding PCT Application No. PCT/EP2007/005694, 7 pages.

* cited by examiner (PRIOR ART)

CONTROL CIRCUIT AND METHOD FOR CONTROLLING LIGHT EMITTING DIODES

BACKGROUND

Light emitting diodes, LEDs, usually have a relatively high light output with a high efficiency and small dimensions. LEDs can emit light with a light spectrum corresponding to a visible range or to an infrared range or to other non-visible frequency ranges.

LEDs can be used in backlight systems of displays of television or monitor systems. With LEDs it is possible to achieve a more evenly distributed lighting system than with a conventional neon light for example.

Controlling of the brightness of a LED can be done by varying the value of a current through the LED. This can lead to a variation of the spectral color of the LED. Another way of controlling LEDs is the use of pulse width modulated, PWM signals. In this case a mean current through the LED primarily has the same value.

FIG. 6 shows an embodiment of a conventional control circuit for controlling several strings STR1, STR2, STR5 of LEDs. Each string comprises a LED driving circuit VS1, VS2, VS5, for example a voltage source, and a switch S1, S2, S5. The brightness of the LED is controlled by switching on or off the strings STR1, STR2, STR5 depending on a pulse width modulated switching signal generated by a LED string switching control CCPWM. When switching the switches S1, S2, S5, a current flow for the LED strings STR1, STR2, STR5 is completely switched on or off. This leads to high current peaks or spurs which cause electromagnetic interference, EMI.

When using a pulse width modulation, the switching signal in a backlight system is usually synchronized with signals derived from a video signal, for example horizontal or vertical synchronization signals as HSYNC or VSYNC. This can lead to optical interference between the switching signal and the synchronization signals. It is possible that the back lighted screen becomes dark on the same position or at the same time respectively when generating the video image from the video signal. For example, the lower half of the screen can be always darker than the upper half because of the synchronization.

SUMMARY

A control circuit for controlling light emitting diodes comprises a switch for turning on or off a string of light emitting diodes. A sigma delta modulator comprises a signal input for receiving a control signal, a signal output coupled to a control input of the switch and a clock input for receiving a clock signal with a clock period. A combiner generates a control signal from a data signal and a noise signal. The data signal can correspond to a desired brightness of the LEDs. By using sigma delta modulation and introducing a slight variation of the data signal by combining it with a noise signal the points in time for switching the LEDs are diversified advantageously. This can lead to a more evenly distributed brightness, for example in a backlight system of a video screen.

The inventive principle can easily be adapted to a greater number of controlled strings.

BRIEF DESCRIPTION OF THE DRAWINGS

Implementations are explained in more detail using exemplary embodiments with reference to the drawings, in which.

DETAILED DESCRIPTION

Figure 1:
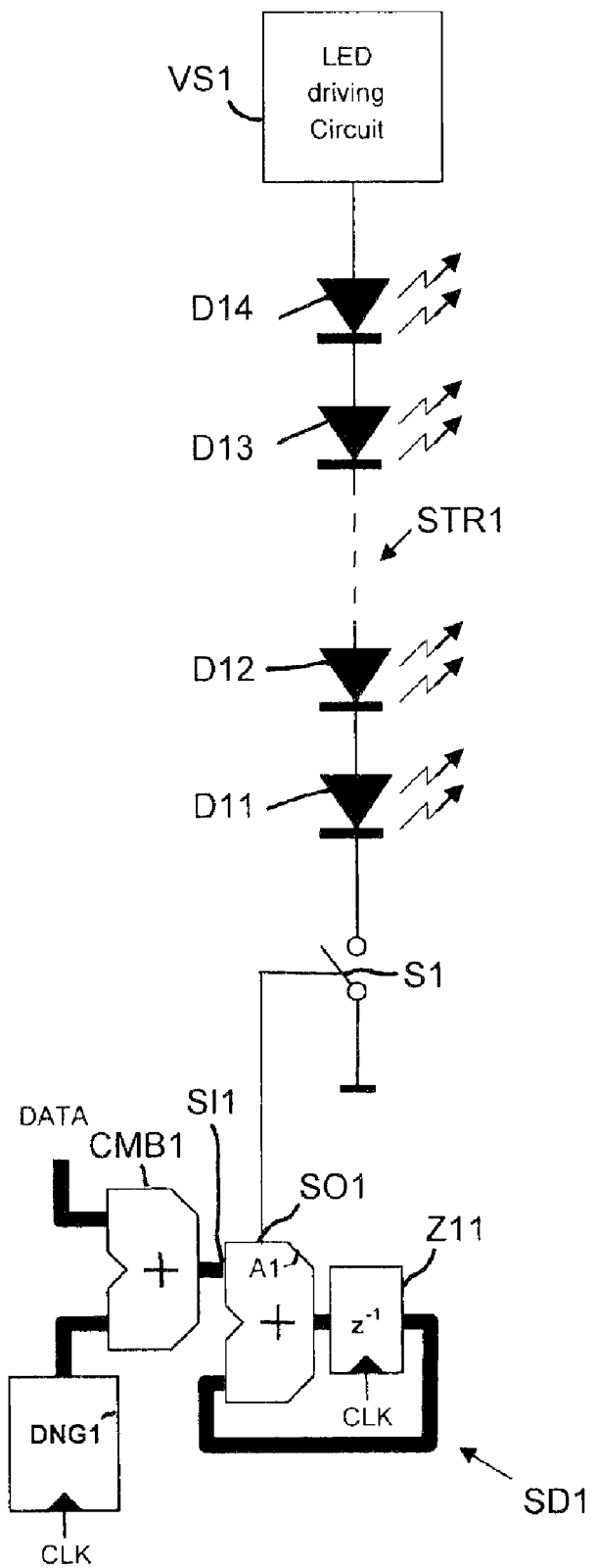
FIG. 1 shows a first embodiment of a control circuit according to one implementation.

FIG. 1 shows an exemplary embodiment of a control circuit according to one implementation for controlling LEDs. A first string STR1 of LEDs comprises several LEDs D11, D12, D13, D14. The number of LEDs is not limited to the four LEDs shown. The LEDs D11, D12, D13, D14 are connected in series between a LED driving circuit VS1 and a switch S1 for turning on or off the first string STR1.

The control circuit comprises a first sigma delta modulator SD1 which is formed by an adder A1 and a delay element Z11. A first combiner CMB1 receives a data signal DATA and a first noise signal generated by a first noise generator DNG1. The output of the first combiner CMB1 is connected to an input of the first adder A1 which forms the signal input SI1 of the first sigma delta modulator SD1. A carry output of the first adder A1 forms a signal output SO1 of the sigma delta modulator SD1 and is connected to a control input of the switch S1.

The data signal DATA can be a binary data word corresponding to a desired brightness of the LEDs. The noise generator DNG1 can be a digital noise generator, for example with fed back shift registers and XOR outputs. The digital noise generator can generate a digital noise signal with an arbitrary word length. The word length of the noise signal determines the randomness of the switching signal. The word length of the data signal usually is greater than the word length of the noise signal.

According to the inventive principle the switch S1 is controlled by the switching signal which is modulated according to the sigma delta principle. Thus a bit stream is generated from the desired brightness, where a time averaged mean value of the bit stream corresponds to a value of the control signal. The clock frequency of the clock signal CLK is usually relatively high compared to a change frequency of the data signal DATA.

Because the digital noise generator DNG1 generates a pseudo-random sequence with positive and negative numbers with a mean value of zero, the mean value of the data signal DATA is not changed in average over time. Therefore the control signal provided on the signal input SI1 of the sigma delta modulator SD1 still corresponds to the data signal DATA, that means the desired brightness in average over time. Therefore the switching time or instance of switching is slightly varied, which reduces the effect of EMI.

Figure 2:
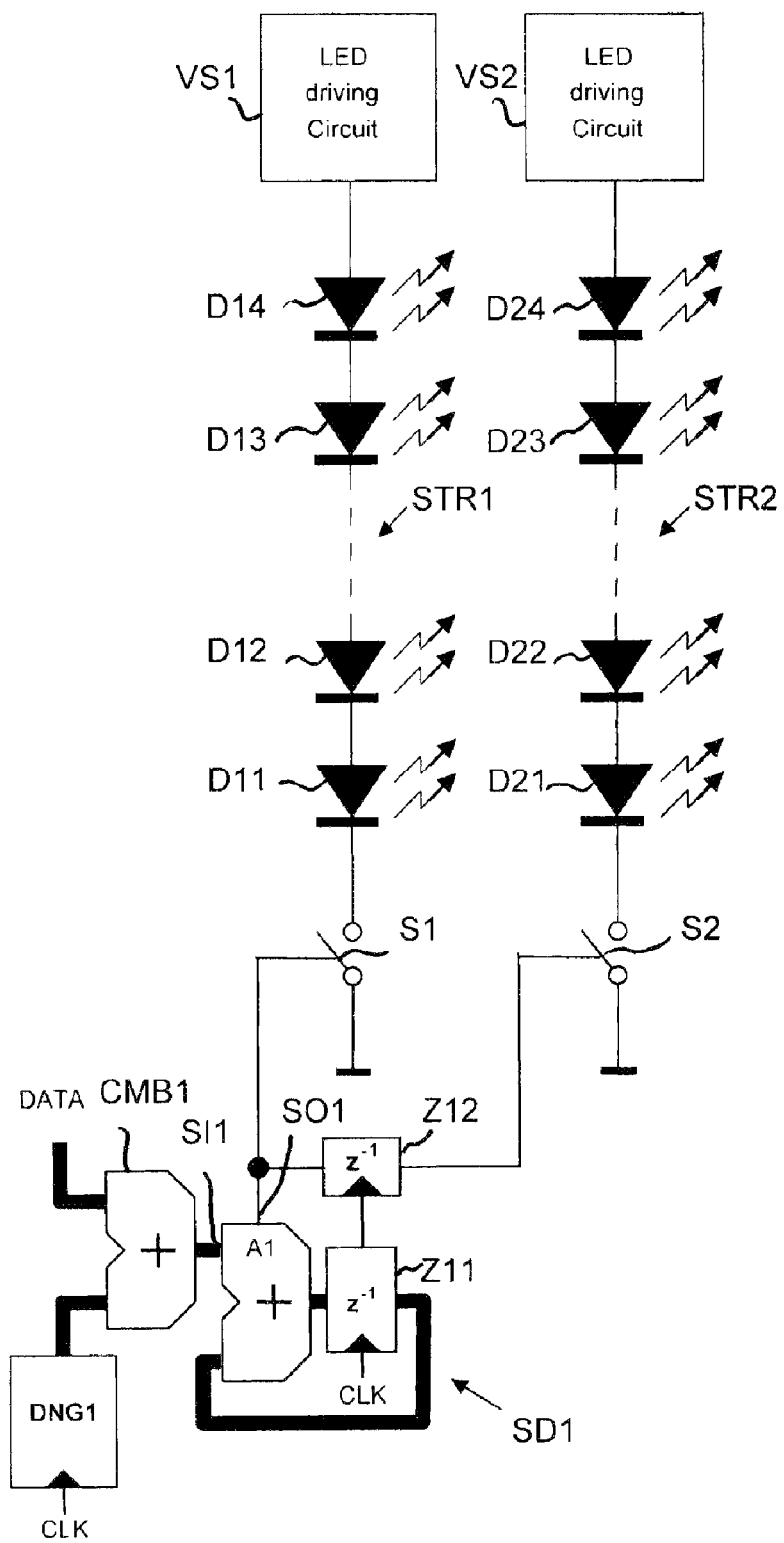
FIG. 2 shows a second embodiment of a control circuit according to one implementation.

FIG. 2 shows another embodiment of a control circuit according to the one implementation. In this embodiment also a second string STR2 of LEDs is controlled by the control circuit. The string STR2 comprises a LED driving circuit VS2 and a second switch S2 for turning on or off the second string STR2.

In addition to the control circuit shown in FIG. 1, the control circuit comprises a delay element Z12 which on the input side is coupled to the signal output SO1 of the first sigma delta modulator SD1. An output of the delay element Z12 is coupled to a control input of the second switch S2. The delay element Z12 comprises a clock input for providing the clock signal CLK.

Thus the second switching signal at the output of the delay element Z12 is a delayed version of the first switching signal with a delay time corresponding to or being equal to a clock period of the clock signal CLK.

A time averaged mean of the current through the second string STR2 is not influenced by the delay, but as the first string STR1 and the second string STR2 are switched on or off at different times, the total current at a time is reduced. The total current of the arrangement hereby is the sum of a current through the first string STR1 and the current through the second string STR2. Therefore the height of current steps of the total current is further reduced. This also leads to a reduction of EMI.

Figure 3:
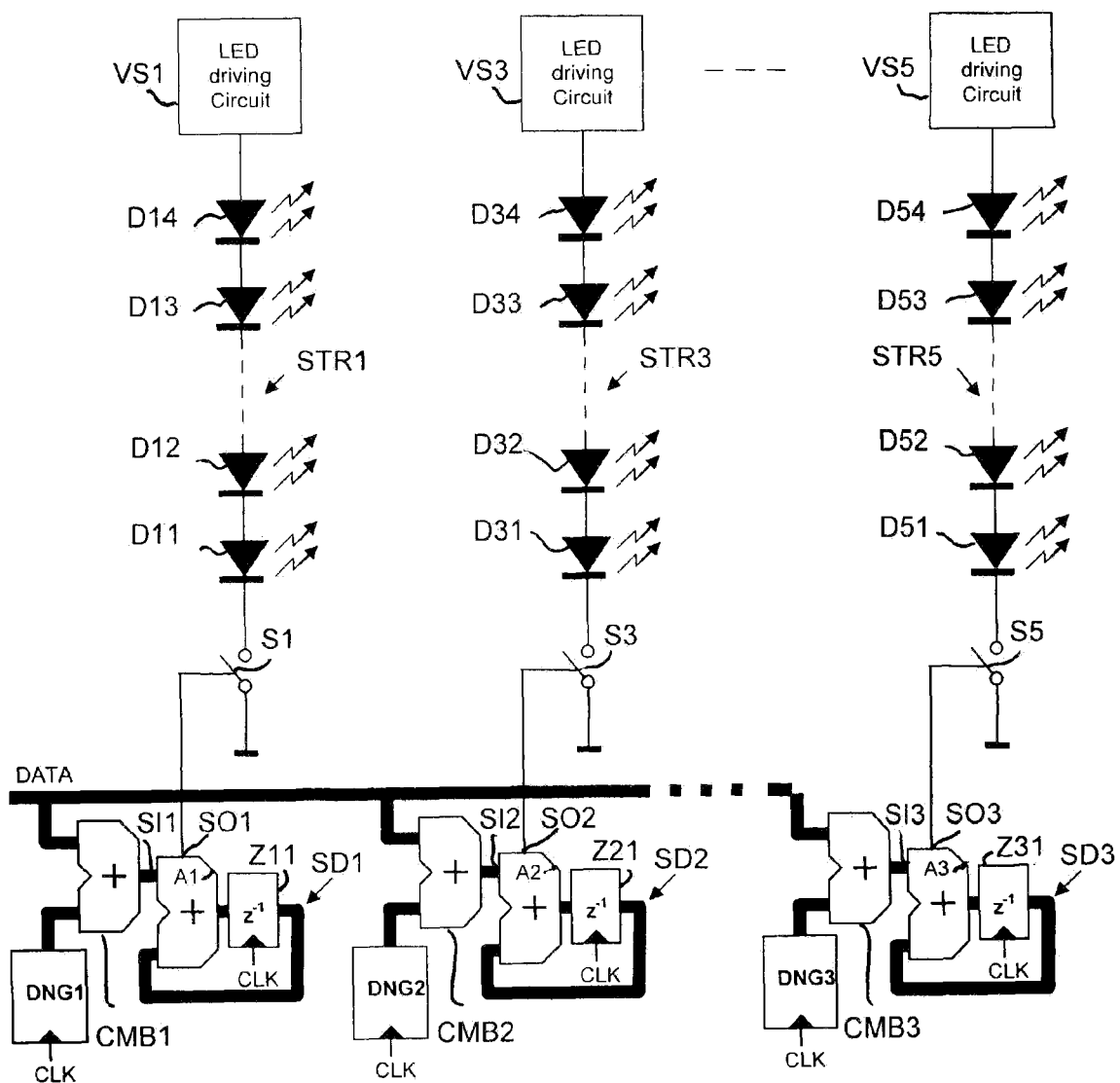
FIG. 3 shows a third embodiment of a control circuit according to one implementation.

FIG. 3 shows a further embodiment of a control circuit according to one implementation. In addition to the embodiment shown in FIG. 1 a string STR3 of LEDs comprising a LED driving circuit VS3, LEDs D31, D32, D33, D34 and a switch S3, and a string STR5 with a LED driving circuit VS5, diodes D51, D52, D53, D54 and a switch S5. The control circuit comprises a second sigma delta modulator SD2 with an adder A2 and a delay element Z21, a second combiner CMB2 and a second digital noise generator DNG2. A function of the second sigma delta modulator SD2 corresponds to the function of the first sigma delta modulator SD1. The data signal DATA is provided to the second combiner CMB2 along with a second noise signal generated by the second digital noise generator DNG2. The pseudo-random noise sequence of the second noise signal usually is different from the respective sequence of the first noise signal. Therefore the second control signal generated by the second combiner CMB2 and provided to the sigma delta modulator SD2 slightly differs from the first control signal. As described before for the sigma delta modulator SD1, the second sigma delta modulator SD2 generates a second switching signal for controlling the second switch S2 from the second control signal. As the first and the second control signals differ, this leads to differing first and second switching signals and differing points in time for switching the strings STR1 and STR3.

As described for the second sigma delta modulator SD2, any number of further sigma delta modulators with respective combiners and digital noise generators can be provided, shown as an example with sigma delta modulator SD3, combiner CMB3 and digital noise generator DNG3 which control the LED string STR5.

All combiners are provided with the same data signal DATA. Because every combiner CMB1, CMB2, CMB3 is coupled to an independent digital noise generator DNG1, DNG2, DNG3, the control signals generated by the combiners differ from each other. This results in differing switching signals accordingly. The average value of the LED current in each of the strings STR1, STR3, STR5 in general is determined by the data signal DATA only. A total current of all strings at a time is reduced because the strings are not switched synchronously. Accordingly, using the inventive principle the synchronous switching of LED strings can be circumvented although the respective average current in each LED string is unchanged.

Figure 4:
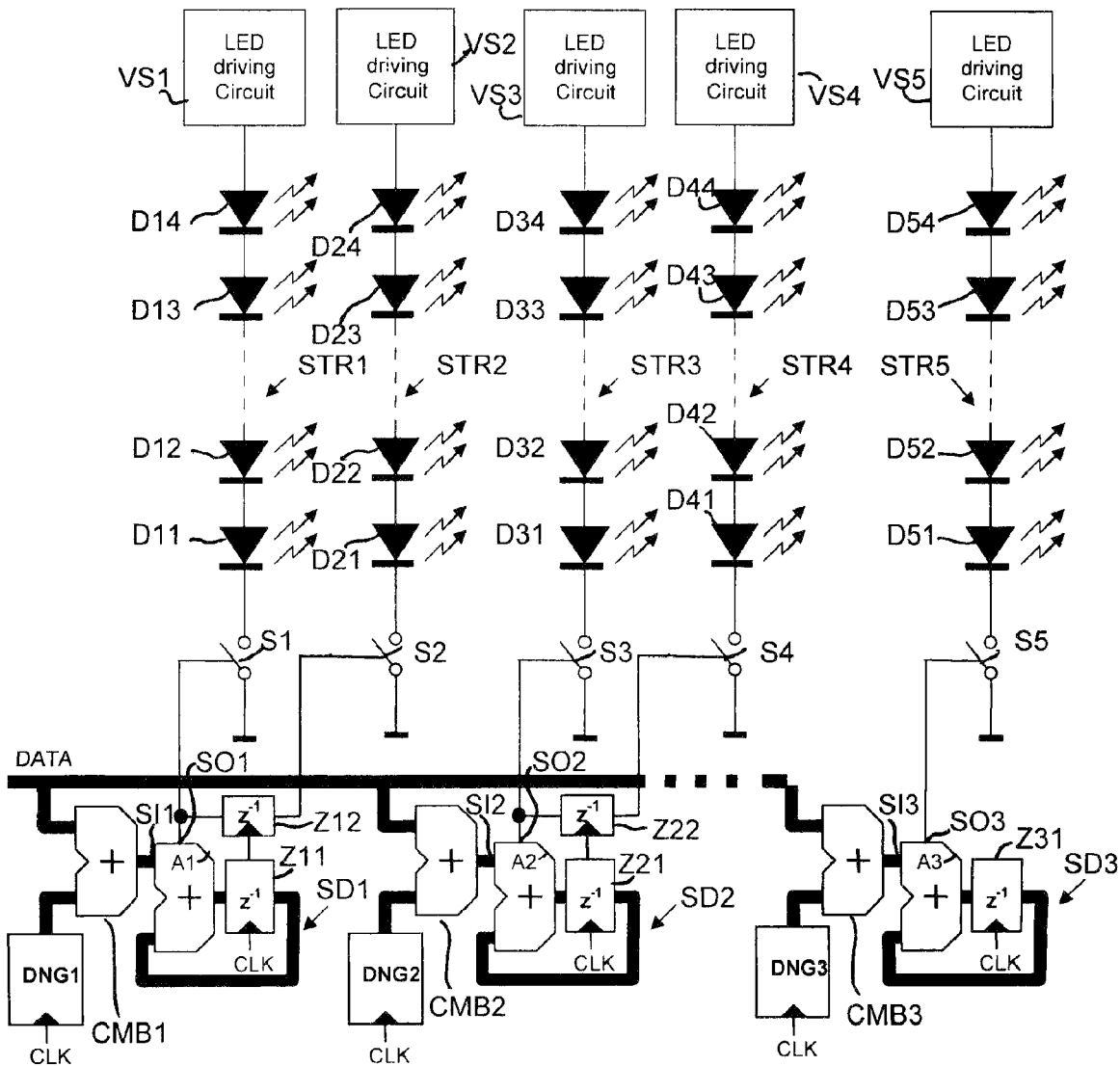
FIG. 4 shows a fourth embodiment of a control circuit according to one implementation.

FIG. 4 shows another embodiment of a control circuit according to one implementation controlling several LED strings STR1, STR2, STR3, STR4, STR5. Also the LED string STR4 comprises a LED driving circuit VS4, LEDs D41, D42, D43, D44 and a switch S4 for turning on or off the string STR4. The number of LEDs in each of the strings is not limited to the shown number of four LEDs. It can be equal for all of the strings, for example when used in a backlight system for a rectangular screen. The number of LEDs could also be different and depends on the respective lighting application. The LEDs or strings of LEDs respectively can be distributed equally over a screen area.

Controlling of the LED strings STR1 and STR2 corresponds to the embodiment shown in FIG. 2. In this the first switching signal for controlling the switch S1 is generated by the first sigma delta modulator SD1 and the second switch is controlled by the second switching signal which is a delayed version of the first switching signal.

LED strings STR3 and STR4 are controlled in a similar manner as LED strings STR1 and STR2. A third switching signal is generated by the sigma delta modulator SD2 depending on the data signal DATA and the second noise signal generated by the digital noise generator DNG2. A fourth switching signal for controlling the fourth LED string STR4 is generated by delaying the third switching signal for one clock period of the clock signal CLK by means of the delay element Z22.

Also further strings of LEDs could be controlled in a similar manner. As an example, a further string STR5 is controlled by a further switching signal generated by the sigma delta modulator SD3, as described for FIG. 3.

The combiners CMB1, CMB2, CMB3 and the adders A1, A2, A3 of the respective sigma delta modulators can be implemented as accumulators with a respective word length corresponding to a word length of the data signal DATA and a noise signal. The accumulators can be formed in hardware using for example simple logical circuits or can be realized in a digital signal processor, DSP. Also the sigma delta modulation can be performed using digital signal processing.

Figure 5:
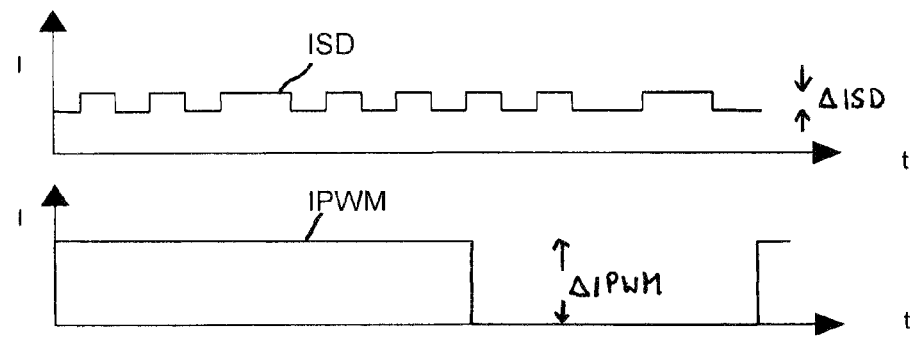
FIG. 5 shows an exemplary time current diagram and FIG. 6 shows an embodiment of a conventional control circuit.
Figure 6:
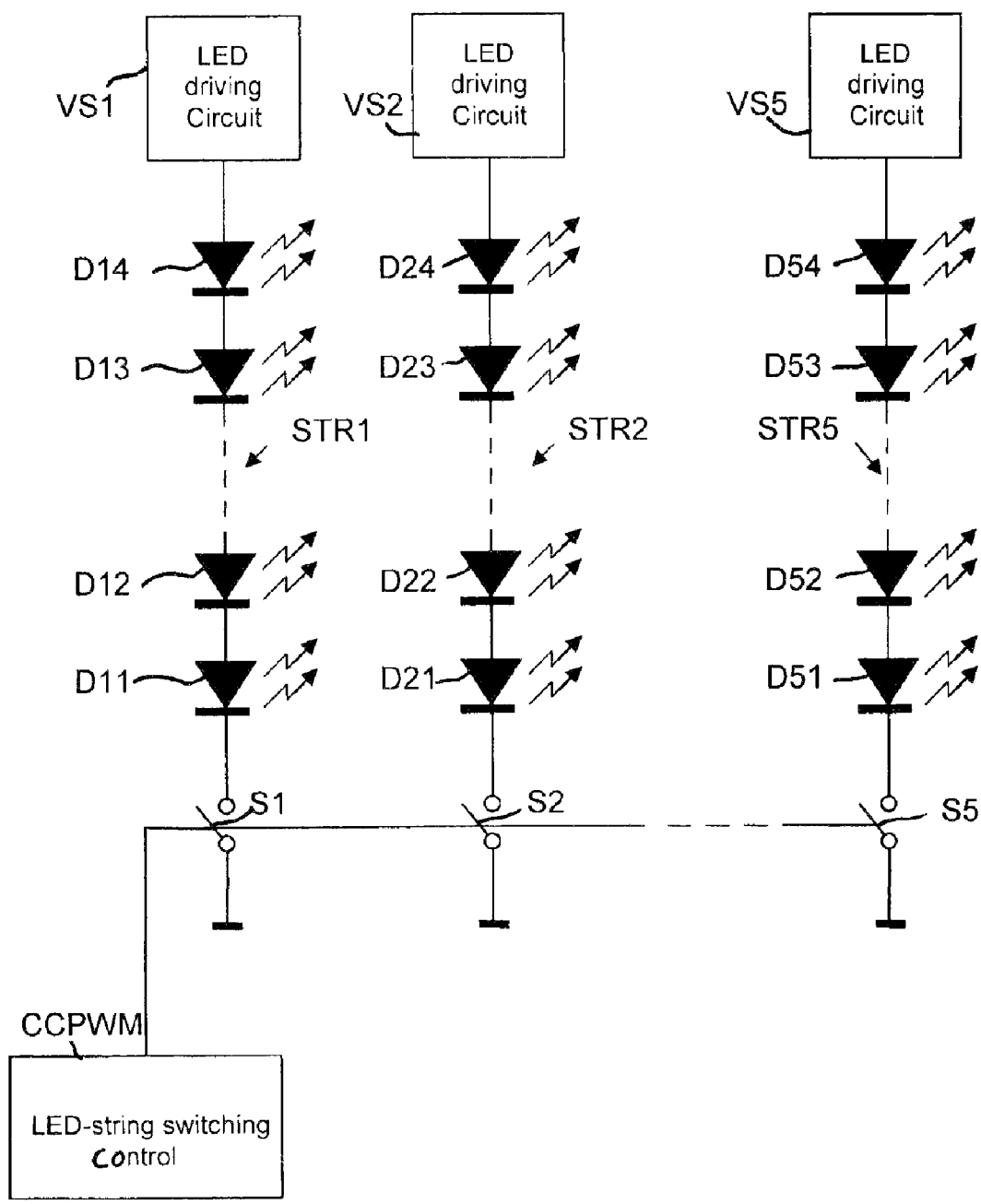

FIG. 5 shows a current time diagram comparing a total current of a control circuit according to one implementation and a conventional control circuit. In the lower half of FIG. 5 a total current IPWM of a control circuit using a pulse width modulated switching signal is shown. As an example, the pulse ratio is about 60% according to a desired value for a brightness of 0.6. All LEDs or strings of LEDs respectively are switched at the same time. This results in a large current peak when switching the LEDs on or off respectively. The current peaks cause high electromagnetic interference with high spurs in the electromagnetic frequency spectrum.

The upper half of FIG. 5 shows a total current ISD for LED strings controlled with a control circuit according to one implementation. The desired brightness value corresponds to the respective brightness value of the current IPWM, i.e. about 60%. It can be seen that switching off LED strings is performed more often using the inventive principle which leads to a distribution of the signal energy of the total current ISD over a broader frequency range. Because the current peak ΔISD is smaller than the current peak ΔIDWM, peak values of the frequency spectrum of the total current ISD are smaller. Accordingly, the electromagnetic interference is reduced.

Providing a greater number of strings of LEDs, a total current ISD can be regarded almost constant with current peaks ΔISD being relatively small. Therefore unwanted pulsed currents are avoided.

The inventive principle can be used in television or monitor backlight systems. The strings of LEDs can comprise white LEDs which emit light in the full visible frequency range which is seen as white light by a human eye. Color information could be added by local filtering of the respective spectral components.

As an alternative, the strings of LEDs could comprise colored LEDs, for example red, green, blue LEDs, also known as RGB-LEDs.

Optical interferences between a switching signal and a synchronization signal used in a conventional control circuit which would result in unwanted patterns on the screen can be avoided using the inventive principle.

The invention claimed is:

1. A control circuit for controlling light emitting diodes, comprising:
    a first switch to turn a first string of light emitting diodes on or off, the first switch comprising a control input;
    a first sigma delta modulator comprising:
        a signal input to receive a first control signal;
        a signal output electrically connected to the control input of the first switch; and
        a clock input to receive a clock signal having a clock period; and
    a first combiner circuit to generate the first control signal based on a data signal and a first noise signal;
    wherein the first noise signal comprises a signal having a time-averaged mean value equal to about zero.

2. The control circuit of claim 1, further comprising:
    a second switch to turn a second string of light emitting diodes on or off; and
    a delay element electrically connected between the signal output of the first sigma delta modulator and a control input of the second switch, the delay element for generating a second switching signal to control the second switch based on the signal output of the first sigma delta modulator.

3. The control circuit of claim 2, wherein the delay element has a delay time that corresponds to the clock period of the clock signal.

4. The control circuit of claim 1, further comprising:
    N (N≧1) switches to turn N strings of light emitting diodes on or off, wherein each of the N switches comprises:
        a sigma delta modulator comprising:
            a signal input to receive an $N^{th}$ control signal;
            a signal output coupled to a control input of an $N^{th}$ switch; and
            a clock input to receive a clock signal; and
        a combiner circuit to generate the $N^{th}$ control signal from the data signal and an $N^{th}$ noise signal.

5. The control circuit of claim 1, wherein the first string of light emitting diodes comprises a plurality of light emitting diodes electrically connected to the first switch.

6. The control circuit of claim 1, further comprising a first noise generator to generate the first noise signal.

7. The control circuit of claim 6, wherein the first noise generator comprises an input to receive the clock signal.

8. The control circuit of claim 6, wherein the first noise generator is configured to generate the first noise signal as a pseudo-random noise sequence.

9. The control circuit of claim 1, wherein the first sigma delta modulator comprises an adder and a delay element, the adder for receiving the first control signal and a feedback signal from the delay element.

10. The control circuit of claim 1, wherein the data signal has a word length that is greater than a word length of the first noise signal.

11. A method of controlling light emitting diodes, comprising:
    generating a first control signal based on a data signal and a first noise signal;
    generating a first switching signal based on the first control signal using sigma delta modulation; and
    switching a first string of light emitting diodes on or off based on the first switching signal;
    wherein the first noise signal comprises a signal having a time-averaged mean value equal to about zero.

12. The method of claim 11, further comprising:
    generating a second switching signal by delaying the first switching signal; and
    switching a second string of light emitting diodes on or off based on the second switching signal.

13. The method of claim 12, wherein a delay time for generating the second switching signal corresponds to a clock period of a clock signal used for the sigma delta modulation.

14. The method of claim 11, further comprising, for each of N (N≧1) strings of light emitting diodes:
    generating an $N^{th}$ control signal based on the data signal and an $N^{th}$ noise signal;
    generating an $N^{th}$ switching signal from the $N^{th}$ control signal using sigma delta modulation; and
    switching an $N^{th}$ string of light emitting diodes on or off based on the $N^{th}$ switching signal.

15. The method according to claim 11, wherein the first noise signal comprises a pseudo-random noise sequence.

16. The method of claim 11, wherein the data signal has a word length that is greater than a word length of the first noise signal.

17. The method of claim 11, wherein the data signal corresponds to a desired brightness of light emitting diodes.

18. A control circuit for controlling light emitting diodes, comprising:
    means for generating a first control signal based on a data signal and a first noise signal;
    means for generating a first switching signal based on the first control signal using sigma delta modulation; and
    means for switching a first string of light emitting diodes on or off based on the first switching signal;
    wherein the first noise signal comprises a signal having a time-averaged mean value equal to about zero.

* * * * *